(12) United States Patent
Drubel et al.

(10) Patent No.: US 12,632,691 B2
(45) Date of Patent: May 19, 2026

(54) TIRE RFID TAG WITH SEGMENTED DIPOLE ANTENNA

(71) Applicant: Smartrac Technology GmbH, Leinfelden-Echterdingen (DE)

(72) Inventors: Michael Drubel, Odenthal (DE); Frederic Meyer, Erndtebrueck (DE); Christoph Ohm, Siegen (DE)

(73) Assignee: Smartrac Technology GmbH, Leinfelden-Echterdingen (DE)

( * ) Notice: Subject to any disclaimer, the term of this patent is extended or adjusted under 35 U.S.C. 154(b) by 0 days.

(21) Appl. No.: 18/860,034

(22) PCT Filed: May 10, 2023

(86) PCT No.: PCT/EP2023/062512
§ 371 (c)(1),
(2) Date: Oct. 25, 2024

(87) PCT Pub. No.: WO2023/222488
PCT Pub. Date: Nov. 23, 2023

(65) Prior Publication Data
US 2025/0342338 A1 Nov. 6, 2025

(30) Foreign Application Priority Data
May 16, 2022 (EP) .................................... 22173640

(51) Int. Cl.
*G06K 19/077* (2006.01)
*B60C 19/00* (2006.01)
(Continued)

(52) U.S. Cl.
CPC ... *G06K 19/07775* (2013.01); *G06K 19/0723* (2013.01); *H01G 9/26* (2013.01); *H01Q 1/2225* (2013.01); *B60C 19/00* (2013.01)

(58) Field of Classification Search
CPC ......... G06K 19/07775; G06K 19/0723; H01G 9/26; H01Q 1/2225; B60C 19/00
See application file for complete search history.

(56) References Cited

U.S. PATENT DOCUMENTS

| | | | |
|---|---|---|---|
| 7,009,576 B2 | 3/2006 | Adamson et al. | |
| 7,102,499 B2 | 9/2006 | Myatt | |
| | (Continued) | | |

FOREIGN PATENT DOCUMENTS

| | | |
|---|---|---|
| AU | 2012201759 | 9/2012 |
| CA | 2828019 | 5/2015 |
| | (Continued) | |

OTHER PUBLICATIONS

International Search Report and Written Opinion dated Jul. 24, 2023 issued in corresponding IA No. PCT/EP2023/062512 filed May 10, 2023.

*Primary Examiner* — Matthew Mikels

(57) ABSTRACT

Tuneable linear-antenna transponders and methods of making and using thereof are described herein. In some embodiments, the transponder includes two radiators formed of a conductive material, wherein the radiators may be identical or different. In some embodiments, the radiators are divided into a multitude of segments, wherein each segment is in the form of a linear segment or helical spring segment or cylindrical segment. In some embodiments, two of the consecutive segments are different in either shape and/or winding width of the helical spring. The distinct transmission line segments provide additional degrees of freedom, which enables finer/improved tunability of the antenna resonance.

13 Claims, 11 Drawing Sheets

(51) Int. Cl.

| | | |
|---|---|---|
| *G06K 19/07* | (2006.01) | |
| *H01G 9/26* | (2006.01) | |
| *H01Q 1/22* | (2006.01) | |

(56) References Cited

U.S. PATENT DOCUMENTS

| | | | |
|---|---|---|---|
| 8,025,238 | B2 | 9/2011 | Jung et al. |
| 8,157,172 | B2 | 4/2012 | Fenkanyn |
| 8,833,409 | B2 | 9/2014 | Kleckner |
| 8,977,422 | B1 | 3/2015 | Westfall |
| 10,438,110 | B2 * | 10/2019 | Kapp ............... G06K 19/07767 |
| 2004/0189456 | A1 | 9/2004 | Myatt |
| 2006/0290505 | A1 | 12/2006 | Conwell et al. |
| 2010/0108211 | A1 | 5/2010 | Fenkanyn |
| 2011/0032174 | A1 | 2/2011 | Sinnett et al. |
| 2013/0153669 | A1 | 6/2013 | Sinnett |
| 2020/0062050 | A1 | 2/2020 | Destraves et al. |

| | | | |
|---|---|---|---|
| 2021/0019590 | A1 | 1/2021 | Destraves et al. |
| 2021/0070110 | A1 | 3/2021 | Joulin et al. |
| 2021/0098858 | A1 | 4/2021 | Destraves et al. |
| 2021/0295129 | A1 * | 9/2021 | Dong ............... G06K 19/07754 |

FOREIGN PATENT DOCUMENTS

| | | |
|---|---|---|
| CN | 204314922 U | 5/2015 |
| EP | 1352764 | 10/2003 |
| EP | 1526467 | 4/2005 |
| EP | 2013856 | 3/2012 |
| EP | 2524818 | 7/2014 |
| EP | 3179413 | 6/2017 |
| EP | 2274807 | 3/2018 |
| KR | 10-1059589 | 8/2011 |
| WO | 2008/111753 | 9/2008 |
| WO | 2019/186066 | 10/2019 |
| WO | 2019/186067 | 10/2019 |
| WO | 2019/186068 | 10/2019 |

* cited by examiner

Homogeneous Dipole Antenna $Z_{dipole}$

Homogeneous Line $Z_{input}$                                                                 $Z_{open}$ Stacked Line $Z_{input}$                                                                 $Z_{open}$ Stacked Dipole Antenna $Z_{input}$

1
TIRE RFID TAG WITH SEGMENTED DIPOLE ANTENNA

CROSS-REFERENCE TO RELATED APPLICATION(S)

The present application is a national stage application under 35 U.S.C. § 371 of International Application No. PCT/EP2023/062512, which was published in English on Nov. 23, 2023, which claims the benefit of European Patent Application No. 22173640.8 filed May 18, 2022, each of which is incorporated by reference herein in its entirety.

FIELD

The invention relates to highly durable Radio-Frequency Identification (RFID) tags for the identification of tires, which are embedded or otherwise incorporated into the tire, at the time of production of the tire.

BACKGROUND

The identification and tracking of a tire with radio frequency identification (RFID) enables automated and fully digitized traceability over its entire lifecycle. This allows automatic data recognition for the purpose of optimizing intra- and extra-logistical process handling. Moreover, RFID technology provides supportive information about different manufacturing steps at an early stage of the fabrication process, which may be helpful for the correlation of processing data as well as for customer claims. A fully embedded transponder and its associated information remains inseparably connected to the tire over the entire product lifetime. The embedment of the transponder inside the tire, however, is required to have absolutely no negative influence on either the product lifetime or its functionality. In particular, defects and air enclosures, which in the worst case cause damage to, or the destruction of, the tire, have to be avoided. As an embedded transponder per se constitutes a material defect, it is required to integrate the transponder in a minimal disruptive way, i.e., the transponder is required to assume a minimal amount of space inside the tire.

An embedded transponder should have a minimal shape; its resonance frequency can be tuned only by shortening the length of the antenna. Specifically, the tunability of helix-antennas, whose length can be reduced only by reducing the number of windings, is limited by this practice. This can lead to rather large frequency steps of the antenna tuning, especially if the embedding medium is a high dielectric.

There exists a need for more precise resonance tuning of RFID antenna and thereby improve the overall performance of RFID transponders to be incorporated into tires during tire manufacture.

Therefore, more precise resonance tuning of RFID antenna, and constructions containing the same, that improve the overall performance of RFID transponders to be incorporated into tires during tire manufacture are described herein.

SUMMARY

To solve the problem of an insufficient tunability of Linear-Antenna-Transponders, one embodiment of the invention proposes to construct the antenna of a Radio Frequency Identification (RFID) device in such a way that it comprises. In one embodiment, the transponder is linear and contains or includes two radiators formed of a conductive material. In some embodiments, the two or more radiators are identical. In some embodiments, the radiators are divided into a multitude of segments, wherein each segment is in the form of a linear segment or helical spring segment or cylindrical segment. In some embodiments, two of the consecutive segments are different in either shape and/or winding width of the helical spring.

The distinct transmission line segments provide additional degrees of freedom, which enable finer/improved tunability of the antenna resonance. Small reflections of the electro-magnetical signal arise at the transitions between the segments and influence the resonance frequency. Due to the smallness of the occurring reflections, the resonance frequency is less susceptible to changes of a single segment than to changes of the overall antenna length. This enables fine adjustments of the antenna. The final adjustment of the antenna arises as a combination of an adjustment of individual segments as well as the adjustment of the total antenna length.

In some embodiments, the antenna properties of a transponder having a proper matching network and a wire-type antenna can also be tuned. The shape of a RFID antenna determines the specific RF-properties of an RFID label. Likewise, the properties of a transponder having a regular matching network and a wire-type antenna can be varied by introducing different antenna segments.

In some embodiments, one or more (or all) of the antenna segments are designed to meet the mechanical and geometrical requirements of a desired application. For example, the properties of a single line segment can differ by its geometry, e.g., outer radius or winding number as well as by the material used, such as copper, bronze, steel and alloys thereof, wires with an isolation layer, or other materials. Examples of such line segments include, but are not limited to, cylindrical wire segments (referred to as dipole segments); conical wire segments; hollow lines; helices having an arbitrary pitch; helices or wires having envelope curves, that form a body of revolution; helices with contacted, i.e., shorted windings; and helices with contacted windings made from insulated wire.

In some embodiments, helical forms or segments are advantageous as they reduce the possibility of antenna breakage and thereby minimize the risk of damaging the tire. At the same time, the form or segment is open enough for the ingress of the rubber mass during the manufacturing process of the tire, e.g., vulcanization.

In some embodiments, each of the two identical conductive radiators are divided into at least three segments. The more segments a dipole antenna has, the more degrees of freedom are available for fine tuning of the antenna, allowing for an adaptation that is not possible with solutions according to the prior art.

In still other embodiments, the segments on each of the two identical radiators directly adjacent to the IC chip are linear: the first segment serves as a linear dipole segment. In a dipole antenna only those parts that are in the direction of a dipole contribute to the radiation. In a helical antenna, only those vectors in the direction of the dipole contribute, while the vectors perpendicular to the dipole direction do not. A linear segment can increase the effective antenna length.

In an alternative embodiment, the segments on each of the radiators directly adjacent to the IC chip are of a helical spring form or shape with a larger winding width than the consecutive segment. A larger winding width increases the fraction of the antenna alongside the dipole. This allows for an increase in effective antenna length without giving up the stable helical spring form/shape.

In another embodiment, at least one of the segments on each of the radiators is a helical spring segment with a winding width small enough that the windings are in electrical contact with each other. The windings can be formed using uninsulated wire and shortcut the windings. Alternatively, a hollow cylinder can be used. Such segments can form sharp transitions between antenna segments, creating signal reflections, which then contribute to the impedance, as described further below. Alternatively, the windings can be insulated against each other.

In other embodiments, all segments in the RFID transponder device are the same length alongside the radiators. In alternative embodiments, the segments in the RFID transponder device are of at least two different lengths alongside the radiators.

In some embodiments, the RFID transponder device contains an IC chip attached to a primary antenna and a dipole antenna, wherein the is a one-piece helical spring antenna and the dipole antenna is capacitively or inductively connected to the IC chip by means of the primary antenna, and the chip with the primary or coupling antenna being located at half of the length of the antenna, so that the parts of the one-piece antenna extending to both sides of the chip-primary antenna unit are of the same length and therefore electrically forming two identical radiators. This embodiment can also contain the dipole antenna divided into a multitude of segments. In a preferred version of this embodiment two consecutive segments are different in winding width of the helical spring form.

In another embodiment, the RFID transponder device contains a one-piece dipole antenna divided into at least six segments, symmetrically distributed over the length of the antenna. In some embodiments, the IC chip is coupled via the primary antenna in the middle of the one-piece antenna, creating two electrically identical halves of the dipole. In some embodiments, the segments are in the same position on each half.

In other embodiments, the device is as described above and the segments directly adjacent to the IC chip have a larger winding width than the adjacent segment. A larger winding width increases the fraction of the antenna alongside the dipole. This allows for an increase in the effective antenna length without foregoing the stable helical spring form.

In still other embodiments, the device is characterized by at least two of the segments having a winding width small enough that the windings are in electrical contact with each other and wherein said segments are distributed symmetrically over the length of the antenna. In some embodiments, the windings can be from an uninsulated wire and shortcut the windings. Alternatively, a hollow cylinder can be used. Such segments can form sharp transitions between antenna segments, creating signal reflections, which then contribute to the impedance, as described further below. Alternatively, the windings can be insulated against each other.

Methods for producing the RFID transponder devices described above for integration into a tire are also described herein.

In some embodiments, the method includes the following method steps:

(1) producing two identical radiators from a conductive material;

(2) providing an IC chip suitable for Ultra-High-Frequency RFID, having two contacts for contacting antenna radiators;

(3) attaching one of the two identical radiators to each of the contacts of the IC chip, so that the radiators are in electrical contact with the contacts of the IC chip.

In one embodiment, the conductive material may be a rod or wire. In some embodiments, the radiators are formed such that they contain a multitude of segments, wherein each segment is a linear form, a helical spring form, or a cylindrical form. In other embodiments, the radiator segments are formed such that two consecutive segments are different in either form, or if in a helical spring form, the winding width of the helical spring form.

In another embodiment, the radiators are divided into at least three segments each. The more segments a dipole antenna has, the more degrees of freedom are available for fine tuning of the antenna.

In some embodiments, the method is as described above and the method includes forming the segments on each of the radiators directly adjacent to the IC chip into a linear form.

In other embodiments, the method includes forming the segments on each of the radiators directly adjacent to the IC chip into a helical spring form with a larger winding width than the adjacent segment.

In other embodiments, the method includes forming at least one of the segments on each of the radiators into a helical spring form segment with a winding width small enough that the windings are in electrical contact with each other or into a hollow cylinder.

As discussed above, applications for the RFID tags/labels described herein include molden or vulcanized rubber articles, such as tires. In some embodiments, in order to increase the adhesion between the transponder and rubber, the transponder may be coated with a primer or coating material. In some embodiments, an aqueous overcoat adhesive suited for bonding elastomers may be used e.g. a mixture of dispersed mineral fillers, organic compounds, resins and polymer lattices in an aqueous medium. The primer or coating may be applied by technique known in the art, including spray or dip methods.

In another embodiment, the method of making the devices described herein includes (1) producing a helical spring from conductive material;
In a variant of the method, the conductive material may be a rod or wire;

(2) providing an IC chip suitable for Ultra-High-Frequency RFID, having two contacts for contacting antenna radiators; and (3) attaching a primary or coupling antenna to the IC chip, such that the primary antenna couples the IC chip to the helical spring antenna capacitively or inductively. The primary antenna may be just a short loop antenna or may be a coil antenna that is suited for said coupling.

In a variant of the method above, the helical spring is formed such that it includes or contains a multitude of segments, wherein the segments are distributed or partitioned symmetrically over the length of the helical spring. In a further variant of this method, the segments are formed such that two consecutive segments are different in the winding width of the helical spring form.

BRIEF DESCRIPTION OF THE DRAWINGS

FIG. 3(*a*) depicts a state-of-the-art transponder. FIGS. 3(*b*)-3(*f*) showing various examples of the RFID transponder device according to the invention.

DETAILED DESCRIPTION

Figure 1A:
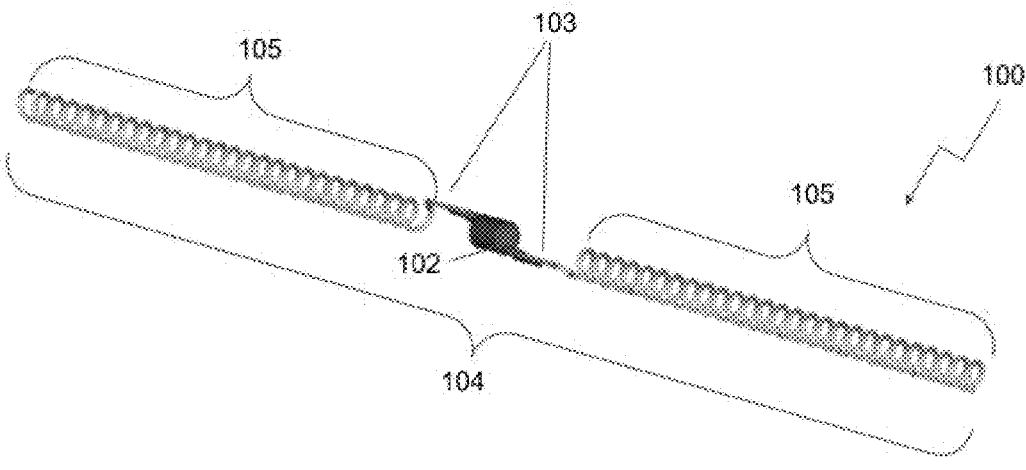
FIG. 1 is a drawing of a prior art RFID device for tire tagging formed as a homogeneous spring antenna (a) and an embodiment of the RFID transponder device with a segmented spring antenna according to the present disclosure (b).

For conventional receiver antennas, the antenna's impedance is matched to the load resistance of the antenna's transmission line or the receiver, which in both cases is typically 50 Ohms. The equality of antenna and load impedance ensures that a maximal amount of power is transferred from the antenna to the load. If an antenna, however, has to be matched to a complex-valued load impedance as for instance in the case of a (passive) RFID transponder IC, the resistance as well as the reactance have to be considered. In order to ensure maximal power transfer, the complex-valued antenna impedance has to be matched in such a way that the resistances of antenna and IC coincide as before and the reactances of both components cancel each other out. This procedure is known as complex-conjugated matching, or maximum power transfer matching, of the antenna. Due to the architecture, (passive) transponder ICs always exhibit capacitive-type reactances. To compensate for this, the transponder antenna needs to present the conjugated reactance, namely an inductance. At those frequencies at which compensation is happening, the transponder is resonant and can be operated optimally. Usually, a complex conjugated matching with respect to the load impedance is established by an electrical matching circuit, which is added to the antenna but also requires additional space.

If the available space for the embedment of the transponder is strongly constrained by a specific application, it can be difficult to find a properly designed matching circuit. Among other applications, this particularly applies to transponders which are to be embedded into tires. Because of the enormous safety risk due to material defects and air enclosures, extremely narrow shaped transponders are typically used for tire applications. For those narrow shaped transponders it is a fundamental problem to find sufficient space for a proper matching network. Such transponders are referred to as Linear Transponders herein. All transponders whose cross-section is insufficient to place a well-suited matching network will be referred to as Linear Transponders herein. It is irrelevant if the transponder antenna is a simple wire, a helix or something else.

A solution to the problem of finding a proper matching element is the usage of discrete circuit elements such as surface mount (SMD) inductors. Due to their inherently high losses, SMD inductors are most often inconvenient or cannot be used because of the lack of space. Yet, to achieve at least a partial matching between the antenna and IC of a Linear Transponder it is common practice to cut the antenna length down depending on the IC used, the surrounding dielectric, and/or the individual application. Even though an ideal, i.e., complex conjugate matching between antenna and IC, can practically never be achieved by changing the antenna length alone, it is sufficient to adjust the transponder's resonance point in an appropriate manner. This concept is based on the close relationship between antenna length, resonance frequency, and impedance; in a simplified picture a linear wire-type dipole antenna is assumed to be a common signal transmission line. Its complex antenna impedance $Z_\alpha$ is then approximately determined by the effective transmission line properties, namely the characteristic line impedance $Z_0$, the geometric length of the line I, the phase velocity $v_{ph}$ of the conducted waves.

On its ends the antenna represents an open transmission line, whose properties can be explained by transmission line theory. In the case of a loss-free transmission line the input impedance is obtained by the relation $$Z_a(\omega) = -iZ_0\cot(\omega l/v_{ph}), \qquad \text{[A]}$$

This expression is an approximation of the antenna impedance, which is capable of adequately describing the resonant properties of the antenna. "Loss-free transmission" is a rather simple assumption, because a proper antenna should always be approximated as a lossy line due to its radiation losses. That being said, a lossy transmission line consists of an appreciable value of series resistance and shunt conductance where different frequencies travel at different speeds. This is opposite to a lossless or loss-free transmission line, where the speed of wave propagation is the same for all frequencies.

The periodic interdependency of the impedance, circular frequency $\omega$, and antenna length l reflects the multitude of harmonic modes of the current distribution along the line. The poles and zeros of the imaginary part of the impedance indicate series- and parallel resonances of the antenna. A series resonance is characterized by a root of the imaginary part of the antenna's impedance function. On the other hand, a parallel resonance is characterized by a root of the imaginary part of the antenna's admittance function. At these points the antenna effectively behaves as a serial or parallel RLC (resistor, capacitor, and inductor) circuit.

In the range between a series and parallel resonance, the antenna has an inductor-like behavior and admits the compensation of the IC's capacitive impedance by [proper selection of the antenna length.

By adjusting the antenna length, it is in principle possible to tune the resonance of a Linear Transponder at will, but the window of the length parameter might be severely limited.

In particular, Linear Transponders, which are enclosed by a dielectric material, experience a strong detuning of the in air resonance frequency, because the dielectric densifies the electric field lines in its interior thereby modifying the antenna's effective transmission line parameters. This causes a contraction of the resonant antenna length by a factor of $\sqrt{\varepsilon_r}$, where $\varepsilon_r$ is the dielectric constant of the material. Thus, parameter adjustments have a larger impact on the more delicate structures of embedded transponders.

In general, the higher the dielectric constant of the embedding material the more precise an antenna structure is required to be adaptable.

Figure 1B:
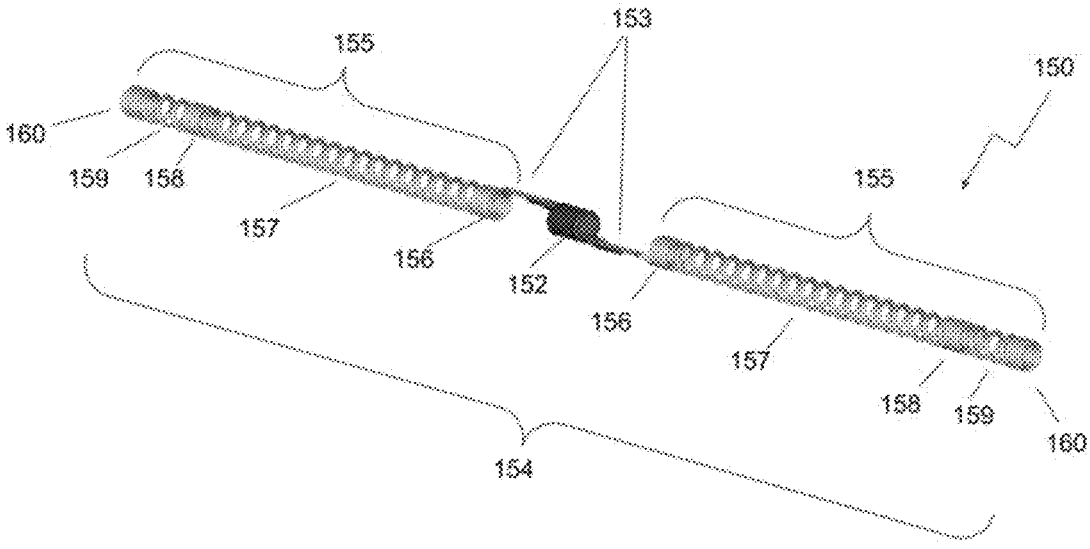

FIG. 1($a$) depicts a RFID transponder device 100 for implementation into a tire according to the prior art. An IC chip 102 is protectively encapsulated and has a conductive connection 103 to two identical radiators 105, which combined form the helical spring dipole antenna 104. Because of its small shape, the transponder has no matching network attached to it and therefore belongs to the class of Linear Transponders. In contrast, FIG. 1($b$) depicts a RFID transponder device 150 according to an embodiment of the present disclosure. The two identical radiators 155 contain segments 156, 157, 158, 159, 160 of different winding widths of the helical spring.

Figure 2A:
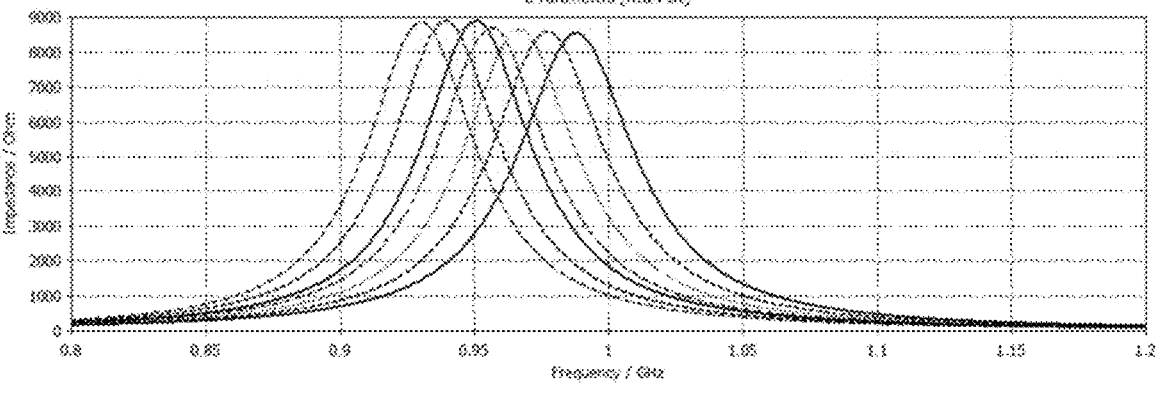
FIG. 2 are graphs of the resonance behavior of a helical antenna by adaption of its winding number (a) in air and (b) embedded into tire rubber.
Figure 2B:
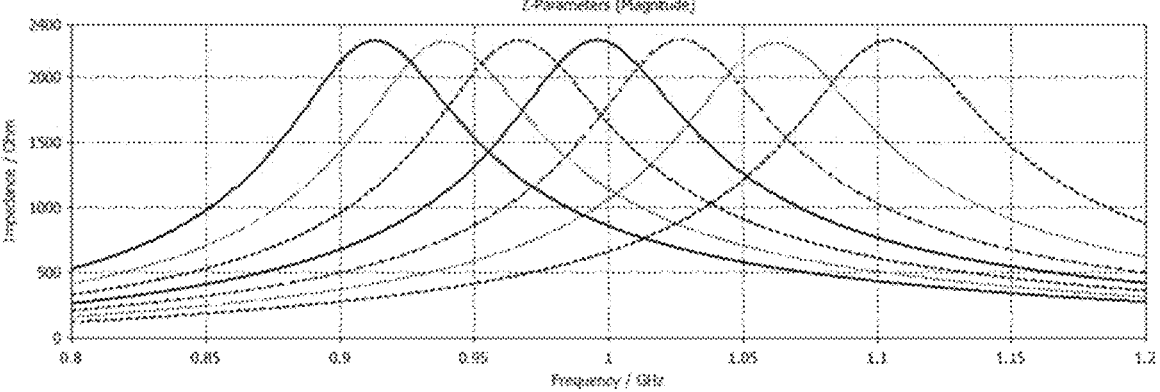
Figure 3A:
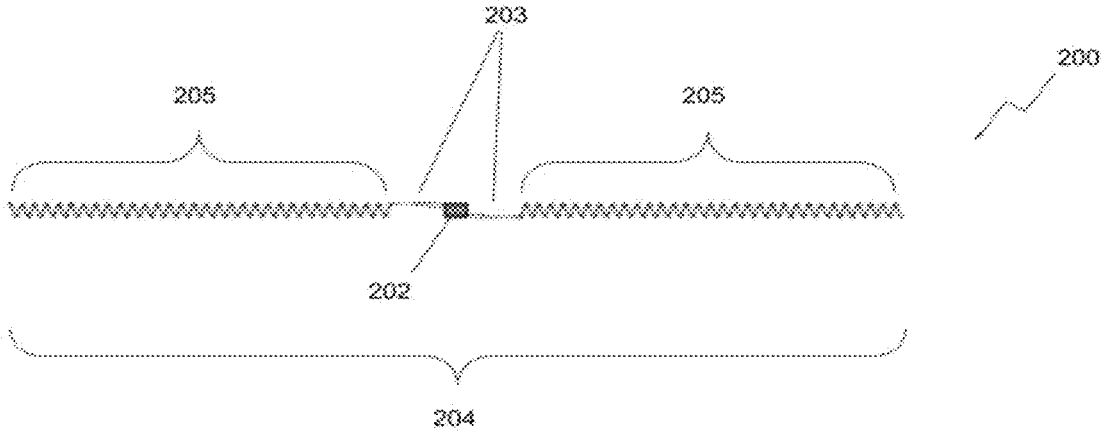
FIG. 3 are drawings of various examples of a RFID transponder device.
Figure 3B:
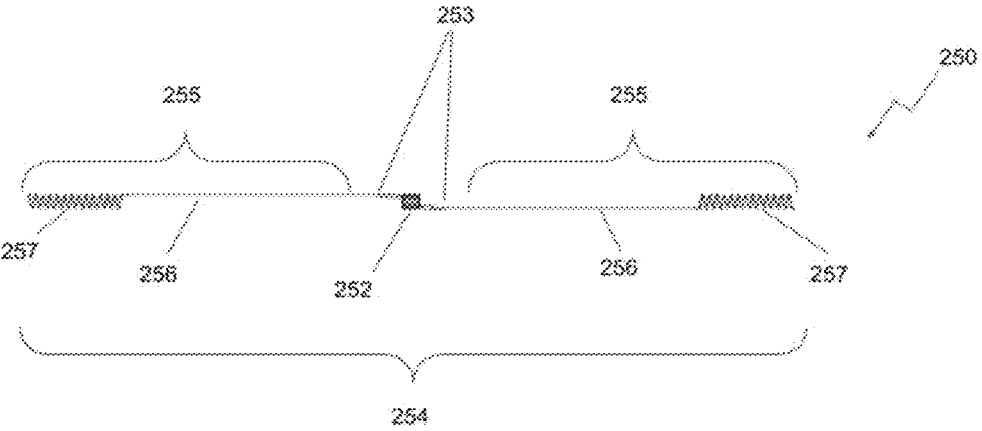
Figure 3C:
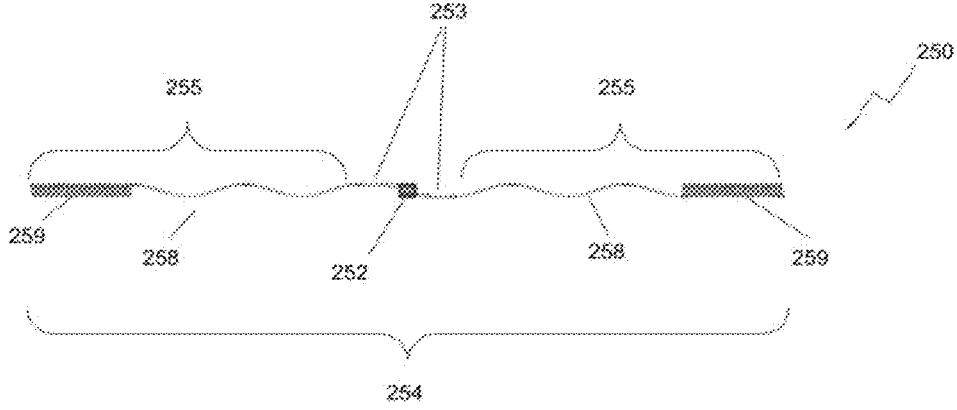
Figure 3D:
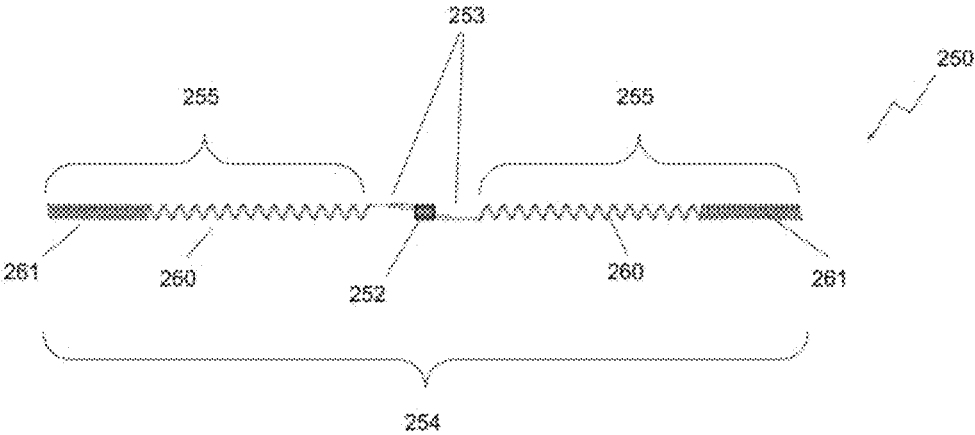
Figure 3E:
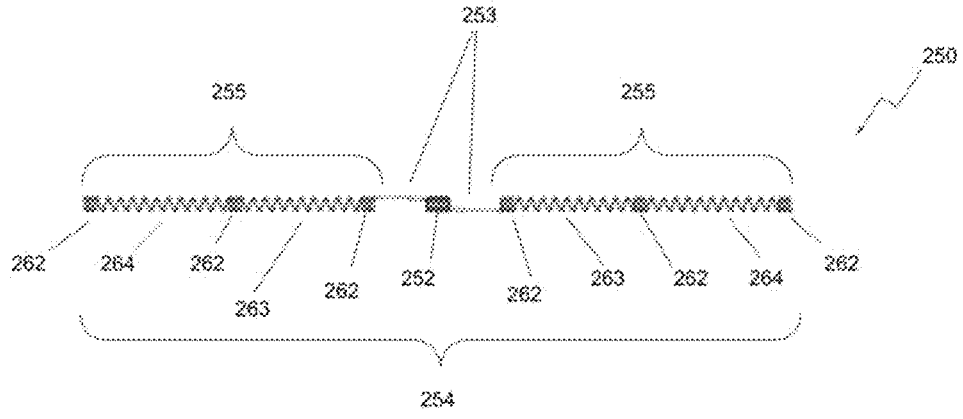
Figure 3F:
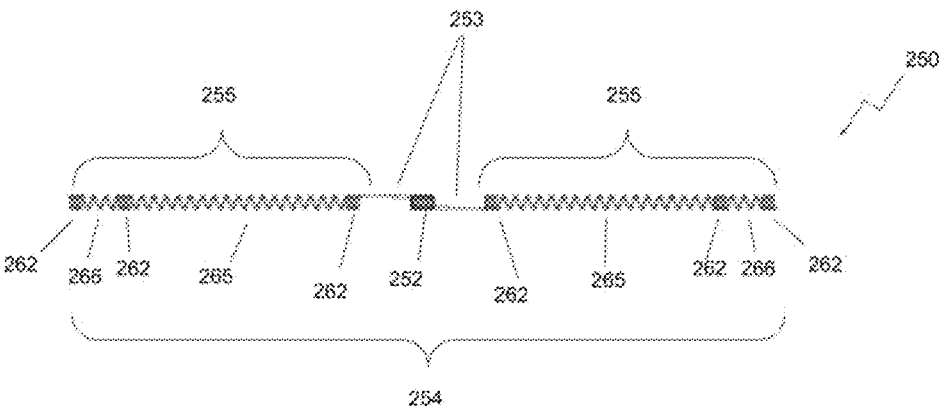

As FIG. 2 illustrates, in the case of helical spring antennas which are to be embedded into a tire but can be adjusted winding by winding only, the concept of tuning the antenna length reaches its limits; by cutting a single winding such a large frequency shift is induced, which cannot be compensated by any other degree of freedom.

Another aspect of this conventional device affects the handling of products of different lengths. Every adaptation of the design, e.g. to a customer-specific material or a specific IC, results in an individual antenna length. For every specific length a set of tools has to be made and prepared for production, which complicates the handling of numerous individual products and therefore increases the cost. In both examples the antenna is cut in the range of one to seven windings. The influence of the dielectric, assumed to be $\varepsilon_r$=6 for tire rubber in FIG. 2$b$, causes a significant spread of the frequency shift per winding.

FIG. 3 schematically depicts different RFID transponder devices. FIG. 3($a$) is a RFID transponder device 200 according to the prior art. An IC chip 202 is protectively encapsulated and has a conductive connection 203 to two identical radiators 205, which combined form the helical spring dipole antenna 204. FIG. 3($b$) is an RFID transponder device 250 with segmented dipole antenna according to an embodiment of the present disclosure and containing a linear dipole segment 256 and a helical spring segment 257 on both of the radiators 255. While the linear dipole 256 is functioning like any standard linear antenna, reflections will occur at the transition to the helical spring segment 257, increasing the impedance.

FIG. 3($c$) illustrates an embodiment of the present disclosure and is a schematic drawing of an antenna with segmented radiators 255 containing two helical spring segments with different winding width: one very large winding width 258 and one with a narrow winding width 259. The large winding width 258 offers stability, while the component of the vector in parallel with the extension of the antenna is still large. At the transition to section 259 with narrow winding width, reflections occur. Varying the winding width of both sections allows for more freedom in tuning the antenna, as is shown in FIG. 3($d$). Here, segment 260 has a narrower winding width than segment 258 and segment 261 is slightly shorter than segment 259, resulting in a different behavior of the antenna 254.

FIG. 3($e$) illustrates an embodiment of the present disclosure and is a schematic drawing of an antenna with segmented radiators 255, containing segments 262 with a narrow winding width, alternating with segments 263 and 264 with a larger winding width.

FIG. 3($f$) illustrates an embodiment of the present disclosure and is a schematic drawing of an antenna containing five segments 262, 265, 266, which differ in their individual lengths with an overall constant antenna length. Three of the five segments 262 have electrically shortened windings, which can be treated as hollow-cylindrical line sections. Alternatively, segments 262 can be replaced with hollow cylinders.

Figure 4:
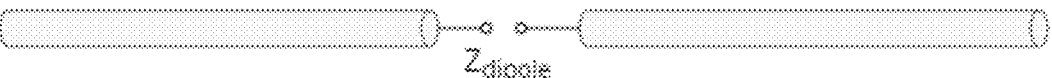
FIG. 4 is a schematic drawing of the approximation of a dipole antenna as twin-lead wire.
Figure 4:
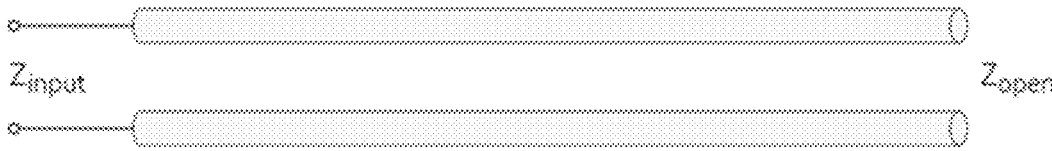
Figure 4:
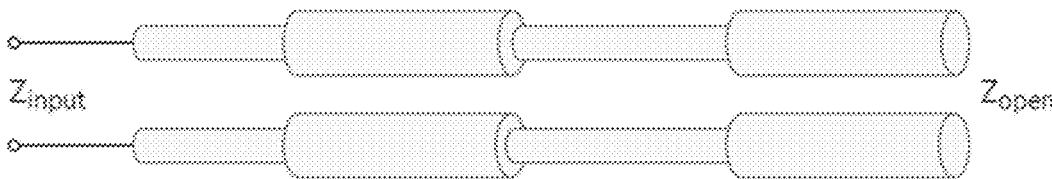
Figure 4:
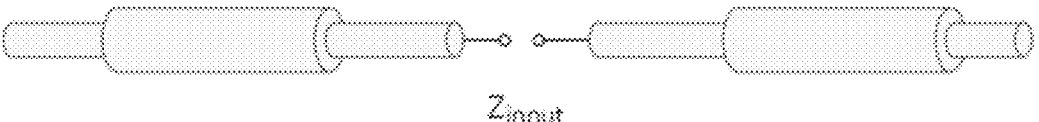

In the following the influence of partial reflections on a segmented linear antenna is examined. The explanations given here primarily serve the qualitative understanding of the present disclosure. Every line section of a segmented dipole antenna i=1, . . . , n is associated with a characteristic impedance, an effective phase velocity $v_{ph,i}$, as well as the length of the section $l_i$. A linear or segmented dipole antenna can be described as twin lead-wire with different diameter to simulate the different impedances of the segments. This is schematically depicted in FIG. 4.

Figure 5:
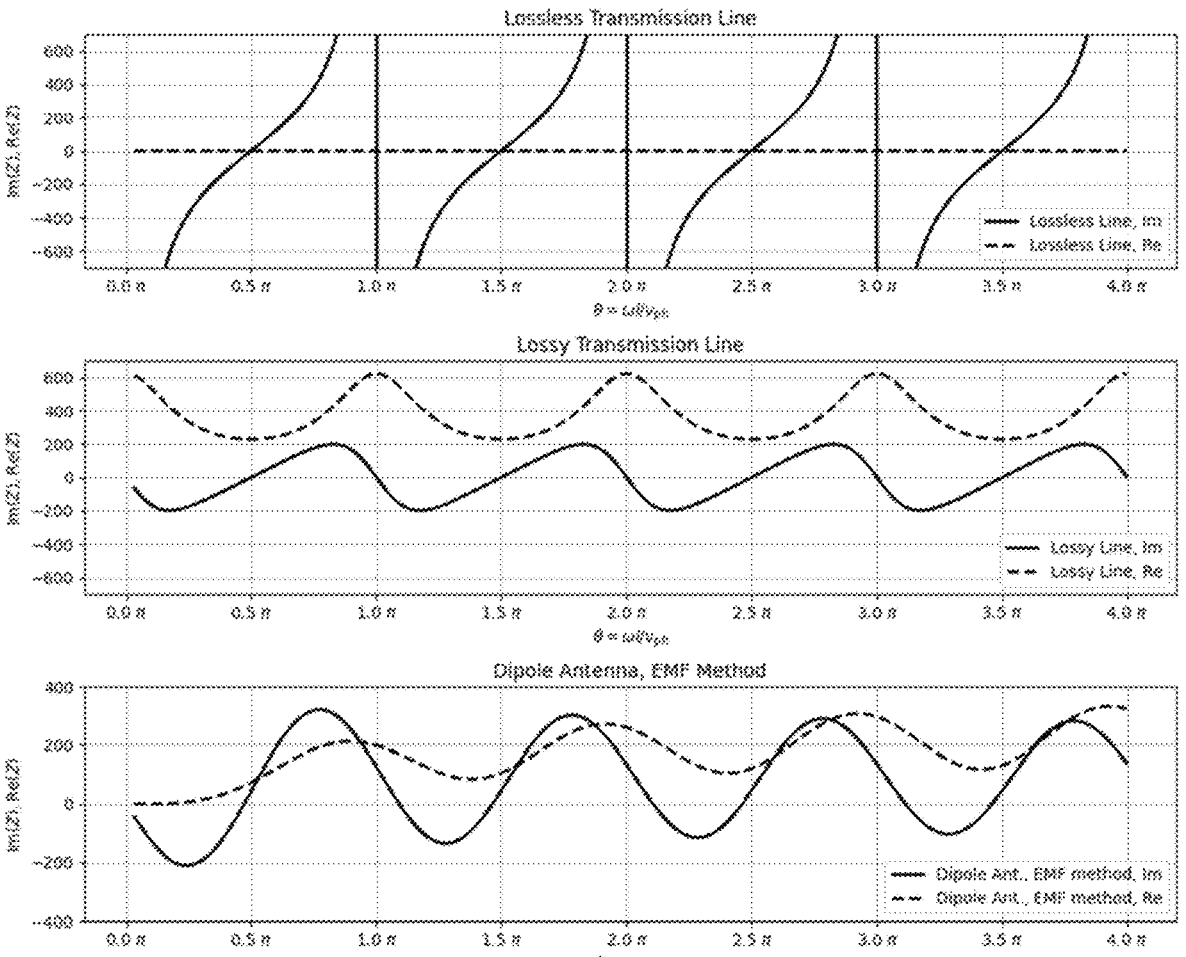
FIG. 5 are graphs of the complex impedances of (a) a loss-free transmission line, (b) a lossy transmission line and (c) a linear dipole antenna.

In FIG. 5, complex impedances of a loss-free transmission line (upper graph), a lossy transmission line (middle graph) and a linear dipole antenna (lower graph) are depicted. The curves indicate that in good approximation a dipole antenna of length L—measured from end to end—can be treated as an open homogeneous transmission line of length L/2—measured from its feeding point to the end. Up to small deviations of minor order, the resonance points of all cases shown here essentially coincide. In the limit 0 the effective transmission line model is inapplicable.

Due to the fact that inductance and capacitance per length of an antenna section is interdependent on its distance to the antenna's food point, the characteristic impedance is continuously changing. Reflections, which originate from this variability, remain small and shall be neglected here to give a qualitative explanation.

Figure 6:
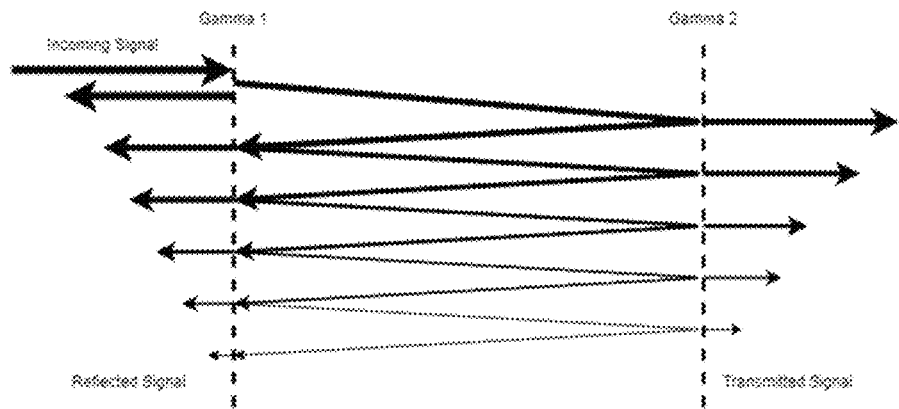
FIG. 6 is a schematic illustration of reflections arising during the transmission of a wave through several antenna segments.
Figure 6:
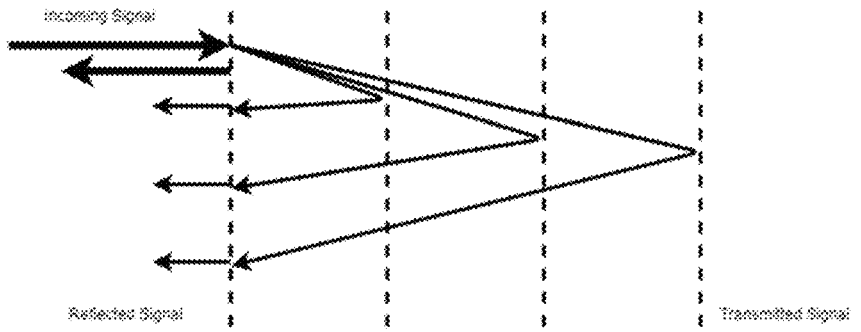
Figure 6:
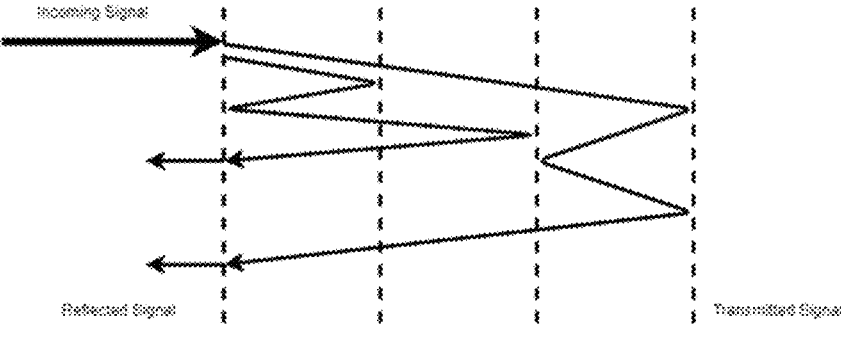

At the transition between two sections, signal reflections, whose amplitude depends on the difference of the line impedances at the transition, occur and can be expressed by $$\rho_i = \frac{Z_i - Z_{i+1}}{Z_i + Z_{i+1}}. \qquad [B]$$

where $\rho_0$ is the reflection coefficient of the transition between the first antenna section and a measurement line; $\rho_n$ is the reflection coefficient, which occurs at the open end of the antenna. As the antenna can be seen as a open transmission line, $\rho_n \approx 1$. Due to multiple signal reflections arising from the transitions between the antenna sections, the actual reflection coefficient at the foot point of the antenna is not equal to $\rho_0$ but rather the coherent sum of all reflections along the line, see FIG. 6. The upper picture of FIG. 6 shows the general case, in which multiple reflections happen at the transition points. The two lower pictures show some examples of first order and third order reflections arising during the transmission of a wave through four sections.

According to relation [B] the reflection coefficient $\Gamma=(Z_A-Z_0)/(Z_A+Z_0)$ is related to the actual and measurable antenna impedance $Z_A$.

In general, the plurality of signal paths cannot be summed in a closed expression. However, if the reflections at the transitions are small, i.e., $\rho_1, \ldots, \rho_{n-1} \ll 1$, a simple approximation formula can be given. The approximation relies on the assumption that because of the small geometry the line segments differ little from each other. Considering the fact that reflections at the beginning and the end of the antenna are not small, in general, $\rho_n \approx 1$ and $\rho_0 \approx 1$, the foot point reflection factor of an antenna with n segments is obtained by $$\Gamma = \frac{\rho_0 + R\Pi_n}{1 + \rho_0 \cdot R\Pi_n}, \tag{C}$$

where the propagation factor $R\Pi_n$ represents the coherent sum of all first order reflections (by neglecting all higher order reflections the given result corresponds to the first order series expansion in terms of the reflection coefficients $\rho_1, \ldots, \rho_n$) of the signal at the transitions between the n segments $$R\Pi = \sum_{i=1}^{n} \rho_i \cdot \exp\left(-2i \sum_{k=0}^{i} \theta_k\right) \tag{D}$$

$$= \rho_1 e^{-2i\theta_1} + \rho_2 e^{-2i(\theta_1 + \theta_2)} + \ldots + \rho_n e^{-2i(\theta_1 + \ldots + \theta_n)}.$$

This nomenclature refers to the nature of the propagation constant as a coherent sum of n (free line) propagation factors and reflection coefficients. Here $\theta_i = \omega l_i / v_{ph,i}$ denotes the electrical phase of the i-th segment with a geometrical length $l_i$, the phase velocity of the segment $v_{ph,i}$, and the angular frequency $\omega$.

Since all segments of the antenna contribute, the coherent sum [D] represents a unique combination of the individual properties of the segments. Consequently, all characteristic transmission line properties of a segment, i.e., its line impedance $Z_i$, its geometrical length $l_i$, as well as its phase velocity $v_{ph,i}$ constitute an additional degree of freedom for tuning the resonance frequency of the antenna. The characteristic impedance of a single segment contributes to the reflection coefficients at its ends. Furthermore, there is a direct relationship between the antenna impedance and the propagation factor [D], $$Z_A = Z_1 \cdot \frac{1 + R\Pi_n}{1 - R\Pi_n} \tag{E}$$

The resonances of the antenna are obtained from the zeros and poles of its impedance function. With that the resonance conditions of the propagation factor are obtained by $$|R\Pi_n| = 1, \arg(R\Pi_n) = (2n+1)\pi, n \in N_0 \text{ (series resonance),} \tag{Fa}$$

$$|R\Pi_n| = 1, \arg(R\Pi_n) = 2\pi n, n \in N_0 \text{ (parallel resonance).} \tag{Fb}$$

As the propagation factor is a complex number, conditions [Fa] and [Fb] constitute requirements to the complex angle arg $(R\Pi_n)$ as well as the modulus $|R\Pi_n|$ of the propagation factor.

Under ideal conditions a single antenna parameter of a Linear Transponder is needed to tune the resonance frequency properly. Typically, this parameter is the antenna length, which has a direct impact on the antenna's resonance points. In the following two examples it shall be demonstrated how the claimed effect differs from the trivial case of simply tuning the antenna length and how it allows for fine-tuning the antenna. Therefore the trivial case of a linear dipole antenna constituting of a single segment and the case of a periodic chain consisting of 2 n+1 segments will be considered.

A linear dipole antenna comprising a single cylindrical wire segment only is characterized by its electrical phase $\theta_{dip} = \omega l_{dip}/c$, where c is the speed of light. Eq. [D] and [E] yield the expression $R\Pi_n = \exp(-2i\theta_{dip})$ from which the well-known impedance [A] of an open transmission line follows. Then the resonance points of the dipole antenna are obtained as described before. Due to the fact, that the phase velocity $v_{ph,dip} = c$ is constant and independent from the wire's geometry, the antenna length $l_{dip}$ remains as the only degree of freedom usable as a tuning parameter.

Figure 7A:
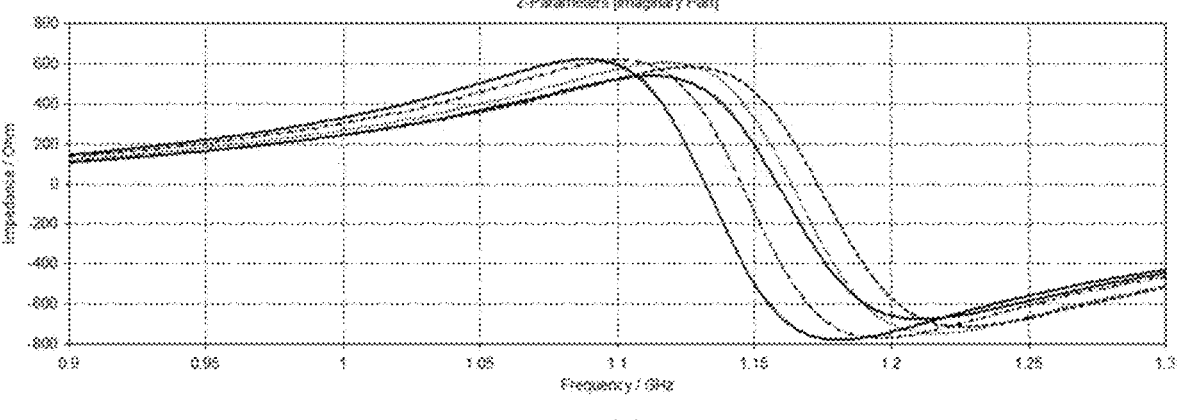
FIG. 7 are graphs of the impedance modifications of an embedded helix antenna containing five segments as shown in FIGS. 3(*e*) and (*f*).
Figure 7B:
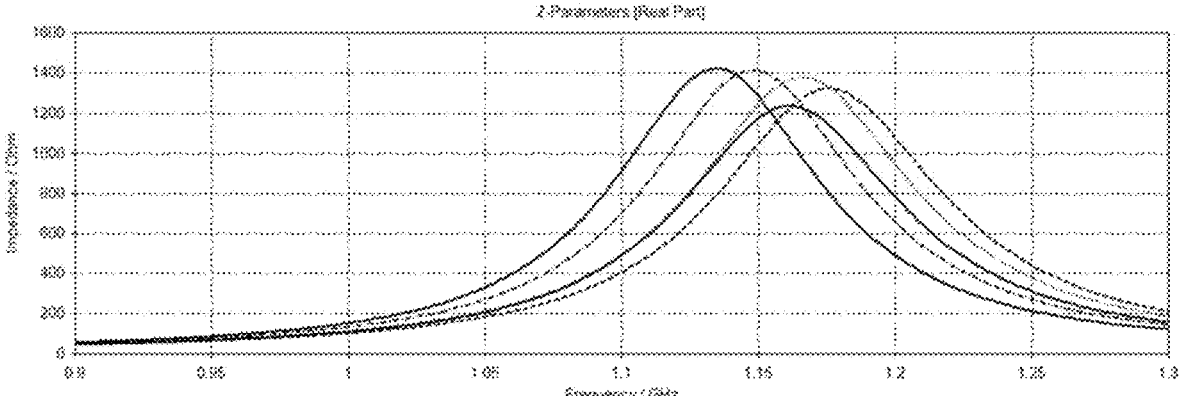

In FIG. 7, the different curves show the impedance as a function of the position of the central section for air FIG. 7$a$ and tire rubber FIG. 7$b$. The originating shifts of the resonance frequency are much smaller as in the case of cutting single windings, see FIG. 2. The results shown are obtained by simulations of the embedded antenna and do not contain simplifying assumptions about effective transmission line parameters.

When looking at the non-trivial case, there are more degrees of freedom which can be used for tuning. To show this, we choose as an example a two-element chain comprising 2n+1 segments arranged in a regular pattern. The characteristic line properties of the two elementary segments shall be $Z_1$, $\beta_1$, $l_1$ and $Z_2$, $\beta_2$, $l_2$, see FIG. 8. As in the case of the homogeneous dipole antenna a closed expression of the propagation factor can be given. By the symmetry of the segment pattern it is $\rho_2 = -\rho_1$ and expression [D] reveals the result $$R\Pi_n = \rho_1 e^{-2i\theta_1} - \rho_1 e^{-2i(\theta_1 + \theta_2)} + \tag{G}$$

$$\rho_1 e^{-2i(2\theta_1 + \theta_2)} - \rho_1 e^{-2i(2\theta_1 + 2\theta_2)} + \ldots + e^{-2i([n+1]\theta_1} =$$

$$e^{-2i[n(\theta_1 + \theta_2) + \theta_1]} \cdot \left[1 + 2\rho_1 \sin\theta_2 \frac{\sin(n \cdot [\theta_1 + \theta_2])}{\sin(\theta_1 + \theta_2)} e^{i[\pi/2 + n(\theta_1 + \theta_2) + \theta_1]}\right].$$

The result consists of two parts; the dominating contribution is of the order O(1), i.e., independent of $\rho_1$ and is—just as in the trivial case—caused by reflections at the open end of the antenna. The electrical phase, which is associated with this contribution, is the sum of the electrical phases of all 2n+1 segments. As a result of the interdependence of the leading order term and the parameters n, $\theta_1$, and $\theta_2$, a matching of the antenna resonance, which is beyond a simple adaption of the antenna length, can be done. Moreover, a small term of the order O($\rho_1$), which considers all first order reflections, is added to the result. As this contribution is much smaller than the dominating one, it is less susceptible to changes of the antenna parameters. To be able to fine tune the antenna it is mandatory to find an appropriate parameter dependency, which allows to vary the first order contribution but keeps the leading order term constant.

Figure 8:
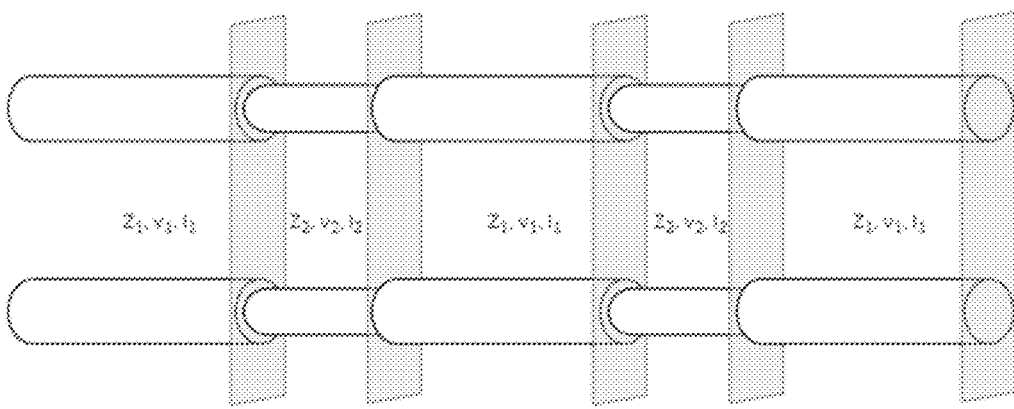
FIG. 8 is a schematic drawing of an antenna formed by a regular chain of two alternating elements.
Figure 9:
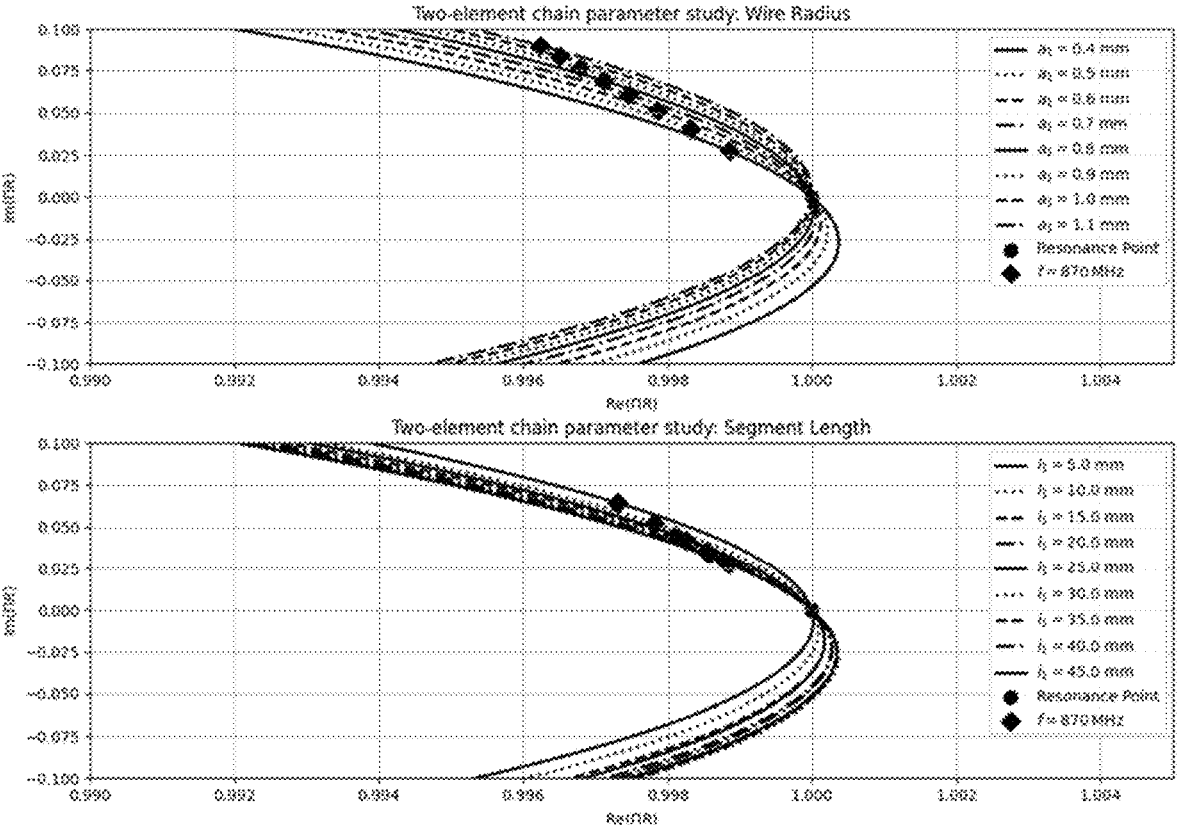
FIG. 9 is a graph showing the results of the parametric studies for the two-element chain with n=3, $@_1$=0.4 mm, $\alpha_2$=1 mm, $l_1$=40 mm, and $\varepsilon_r$=6. The plots show the frequency curves of the propagation factors for different parameter configurations.
Figure 10:
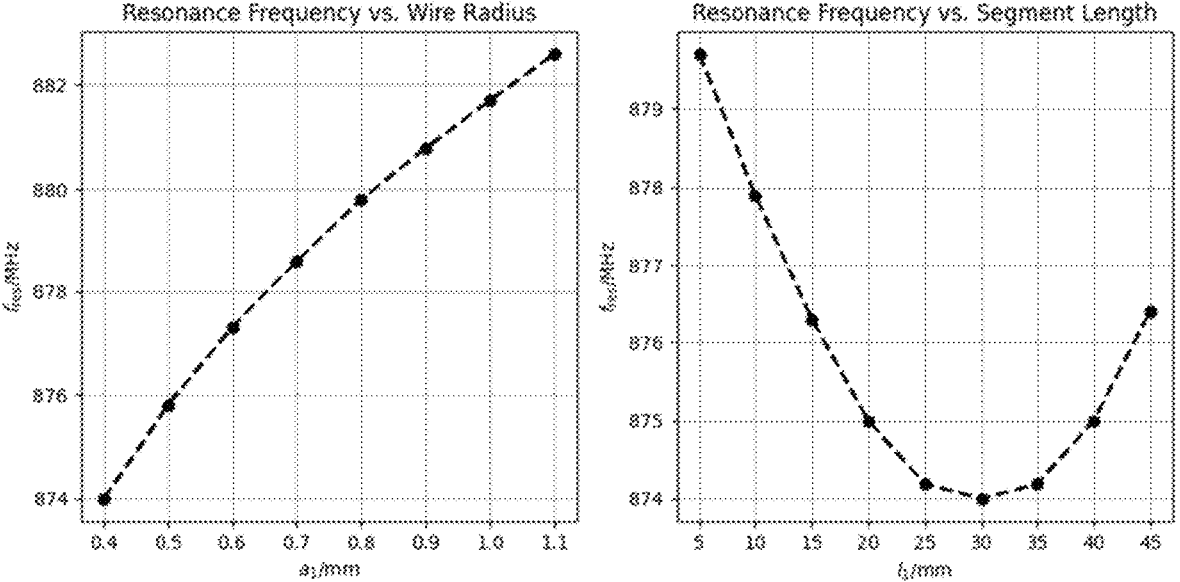
FIG. 10 is a graph showing the results of the parametric studies for the two-element chain with n=3, $@_1$=0.4 mm, $\alpha_2$=1 mm, $l_1$=40 mm, and $\varepsilon_r$=6. The plots show the calculated resonance frequency as a function of the varied parameter.

As a concrete example for such a fine tuning consider a two-element chain consisting of four dipole segments and three helical segments, see FIG. 8. Assuming the windings of the helix to be in contact, i. e., electrically shorted, the helix segments can be treated as hollow cylinders. Because those hollow cylinders are excited below their cut-off frequencies, only the fields outside contribute to the effective transmission line parameters. Hence, the helical segments can be seen as dipole segments where the effective wire diameter equals the outer diameter of the helix. Let $\alpha_1=0.3$ mm and $\alpha_2=1$ mm the radii of the respective line segments, $l_1=30$ mm, $l_2=40$ mm the lengths of the segments, and $\in_r=6$ the dielectric constant of the surrounding medium. FIG. 9 und FIG. 10 show results of parametric studies of the quantities $\alpha_1$ and $l_1$. In both cases the total length of the antenna has been kept constant. Both parameter studies show a weak sensitivity of the resonance frequency as a function of the respective parameter. However, only the parameter $\alpha_1$ represents a uniquely invertible mapping within the evaluated frequency range and is thus better suited for adjustments of the resonance frequency.

In FIG. 9, for all parameter configurations the total antenna length is preserved. The diamond-shaped markers indicate the points of fixed frequency, whereas the O-shaped marker indicates the ideal resonance point.

In FIG. 10 the shapes of the curves imply that the parameter $a_1$ is well suited as a tuning parameter, whereas $l_1$ is not in the considered frequency range.

Figure 11:
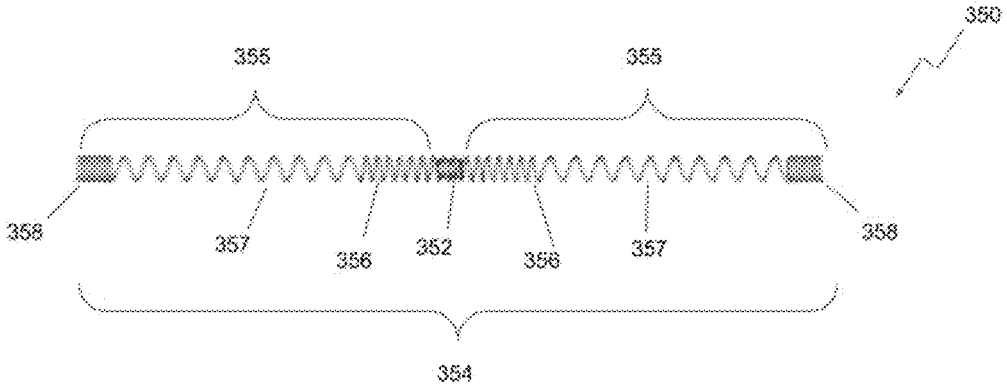
FIG. 11 is a schematic representation of an embodiment of the inventive RFID transponder device with a non-conductive coupling of the IC to the antenna.

FIG. 11 shows a schematic drawing of an example of the RFID transponder device 350 that comprises a one-piece helical spring antenna 354. Instead of being conductively coupled to two identical radiators, the IC chip 352 is coupled to a primary (or coupling) antenna (not shown). The primary antenna couples capacitively or inductively to the helical spring antenna 354. The primary antenna can be directly connected to the IC chip 352 or the IC chip 352 can be attached to a substrate and the primary antenna attached to the IC chip 352 by conductive connections, so that the primary antenna and IC chip 352 are not located together. However, because space is limited, a compact solution is generally preferred. The primary antenna may be located inside the helical spring antenna 354 or on the outside. Ideally, the primary antenna is coupling in a way that the dipole created by the coupling electro-magnetically has two identical radiators 355. This is the case if the coupling is located in the middle (half of the length) of the one-piece helical antenna 354. Other, asymmetrical, variants may be chosen for special applications.

What is claimed is:

1. A RFID transponder device for integration into a tire, comprising:
    an IC chip with contacts and a dipole antenna connected to the IC chip, comprising two identical radiators out of a conductive material characterized by
    the radiators being divided into at least three segments, wherein each segment is one of linear form or helical spring form or cylindrical form and
    wherein two consecutive segments are different in either form or winding width of the helical spring form.

2. A RFID transponder device according to claim 1, characterized by the segments on each of the radiators directly adjacent to the IC chip are of linear form.

3. A RFID transponder device according to claim 1, characterized by the segments on each of the radiators directly adjacent to the IC chip are of a helical spring form with a larger winding width than the consecutive segment.

4. A RFID transponder device according to claim 1, characterized by at least one of the segments on each of the radiators is a helical spring form segment with a winding width small enough that the windings are in electrical contact with each other or is a hollow cylinder.

5. A RFID transponder device for integration into a tire, comprising:
    an IC chip attached to a primary antenna and a dipole antenna formed as a one-piece helical spring antenna, the dipole antenna capacitively or inductively connected to the IC chip by means of the primary antenna, the IC chip being located at half of the length of the antenna, characterized by
    the dipole antenna being divided into at least six segments and wherein two consecutive segments are different in winding width of the helical spring form.

6. A RFID transponder device according to claim 5, characterized by the at least six segments are mirror-symmetrically distributed over the length of the one-piece dipole antenna.

7. A RFID transponder device according to claim 5, characterized by the segments directly adjacent to the IC chip having a larger winding width than the consecutive segment.

8. A RFID transponder device according to claim 5, characterized by at least one pair of the segments having a winding width small enough that the windings are in electrical contact with each other or is a hollow cylinder, wherein said pairs of segments are distributed mirror-symmetrically over the length of the one-piece dipole antenna.

9. A method for producing a RFID transponder device for integration into a tire, the method comprising:
    producing two identical radiators from a conductive material
        providing an IC chip suitable for Ultra-High-Frequency RFID, having two contacts for antennas
    attaching one of the two identical radiators to each of the contacts of the IC chip, so that the radiators are in electrical contact with the contacts of the IC chip characterized by
    forming the radiators from a wire or rod of the conductive material;
    dividing the radiators into at least three segments, wherein each segment is one of linear form or helical spring form or cylindrical form
    forming the segments such that two consecutive segments are different in either form or winding width of the helical spring form.

10. A method according to claim 9, characterized by forming the segments on each of the radiators directly adjacent to the IC chip into a linear form.

11. A method according to claim 9, characterized by forming the segments on each of the radiators directly adjacent to the IC chip into a helical spring form with a larger winding width than the consecutive segment.

12. A method according to claim 9, characterized by forming least one of the segments on each of the radiators into a helical spring form segment with a winding width small enough that the windings are in electrical contact with each other or into a hollow cylinder.

13. A method according to claim 9, characterized by a coating or primer being applied to the RFID transponder device after finishing all other method steps, wherein said coating or primer is a mixture of dispersed mineral fillers, organic compounds, resins and polymer lattices in an aqueous medium.

* * * * *